(12) United States Patent
Guillez et al.

(10) Patent No.: US 6,860,541 B2
(45) Date of Patent: Mar. 1, 2005

(54) VEHICLE RETRACTABLE ROOF WITH SLIDING FRONT AND INTERMEDIATE ELEMENTS AND PIVOTING AND SLIDING REAR ELEMENT

(75) Inventors: Jean-Marc Guillez, Cirieres (FR); Gérard Queveau, Le Pin (FR)

(73) Assignee: France Design, Le Pin (FR)

( * ) Notice: Subject to any disclaimer, the term of this patent is extended or adjusted under 35 U.S.C. 154(b) by 0 days.

(21) Appl. No.: 10/467,288

(22) PCT Filed: Jan. 11, 2002

(86) PCT No.: PCT/FR02/00114
§ 371 (c)(1),
(2), (4) Date: Jan. 26, 2004

(87) PCT Pub. No.: WO02/064392
PCT Pub. Date: Aug. 22, 2002

(65) Prior Publication Data
US 2004/0113453 A1 Jun. 17, 2004

(30) Foreign Application Priority Data
Feb. 14, 2001 (FR) .............................. 01 02013

(51) Int. Cl.$^7$ .................................................. B60J 7/00
(52) U.S. Cl. ........................... 296/107.18; 296/107.17; 296/108
(58) Field of Search ....................... 296/107.17, 107.18, 296/107.19, 107.2, 108, 116

(56) References Cited

U.S. PATENT DOCUMENTS

| 2,704,225 | A | * | 3/1955 | Anschuetz et al. | ......... 296/108 |
| 5,979,970 | A | * | 11/1999 | Rothe et al. | ........... 296/107.17 |
| 6,336,673 | B1 | * | 1/2002 | Rothe et al. | ........... 296/107.17 |
| 6,502,891 | B2 | * | 1/2003 | Russke | .................. 296/107.17 |
| 6,505,881 | B2 | * | 1/2003 | Kinnanen | ............... 296/107.17 |
| 6,604,775 | B2 | * | 8/2003 | Obendiek | ................... 296/108 |

\* cited by examiner

*Primary Examiner*—Stephen Gordon
(74) *Attorney, Agent, or Firm*—Nawrocki, Rooney & Sivertson, P.A.

(57) ABSTRACT

The invention concerns a vehicle retractable roof comprising three rigid roof elements (1, 2, 3) mobile between a position wherein they cover the vehicle passenger compartment (4) and a position wherein they are stowed inside the vehicle rear deck (5), the front element (1) being capable of sliding relative to the intermediate element (2) and the latter being capable of sliding relative to the rear element (3) through pins (6, 7; 8, 9) borne by the front element (1) and by the intermediate element (3) engaged in slide rails (10, 11; 12, 13) extending along the intermediate (2) and rear (3) elements. The invention is characterised in that the displacement of the rear element (3) towards the rear deck (5) is controlled by a pivoting arm (14) articulated a fixed point (15) of the vehicle body and articulated to said rear element (3) and by a slide rail (17) extending inside the rear deck (5) wherein is engaged a pin (18) integral with the rear part of the rear element (3).

8 Claims, 3 Drawing Sheets

# VEHICLE RETRACTABLE ROOF WITH SLIDING FRONT AND INTERMEDIATE ELEMENTS AND PIVOTING AND SLIDING REAR ELEMENT

The invention relates to a vehicle retractable roof comprising a number of rigid roof elements movable between a position in which they cover the passenger compartment of the vehicle and a position in which they are stored in the rear boot of the vehicle.

Such a retractable roof makes it possible to convert a vehicle of the saloon or coupe type into a vehicle of the cabriolet type.

The retractable roof described in French patent application 0 014 187 of 6 Nov. 2000, in the name of the applicant, describes a retractable roof comprising a rear element whose movement towards the rear boot of the vehicle is controlled by a pivoting arm articulated to the body and by a groove extending into the boot.

The rear element is connected to the intermediate element by pivoting levers. Similarly, the intermediate element is connected to the front element by pivoting levers. These pivoting levers cause the intermediate and front elements to swing upwards and above the rear element, during the movement of these elements towards the boot.

The advantage of this essentially pivoting system is that the centre of gravity of the assembly of these elements is very quickly transported towards the rear, which is advantageous for the mechanical strength of the assembly, in particular in the case where the roof has a considerable length and therefore a considerable overhang, when it is detached from the front part of the body.

The drawback is that the front and intermediate elements rise relatively high above the vehicle, on account of the motion of the pivoting levers, when they are moved towards the boot.

The retractable roof described in French patent application 0100083 of 4 Jan. 2001, in the name of the applicant, describes a retractable roof comprising a rear element associated with grooves in order to be capable of sliding towards the boot.

Similarly, the intermediate and front elements are associated with grooves capable of sliding with respect to one another and with respect to the rear element.

The advantages and drawbacks of this essentially sliding retractable roof are exactly the opposite of those of the essentially pivoting retractable roof described above.

This is because the overhang towards the front remains considerable for a long time during the motion of the roof towards the boot.

On the other hand, the roof does not rise high above the vehicle during its movement towards the boot.

The aim of the present invention is to remedy the drawbacks of the retractable roofs described above.

The invention thus relates to a vehicle retractable roof, comprising three rigid roof elements movable between a position in which they cover the passenger compartment of the vehicle and a position in which they are stored inside the rear boot of the vehicle, the front element being capable of sliding with respect to the intermediate element and the latter being capable of sliding with respect to the rear element by virtue of fingers carried by the front element and by the intermediate element, fitted in grooves extending along the intermediate and rear elements.

According to the invention, this retractable roof is characterised in that the movement of the rear element towards the rear boot is controlled on the one hand by a pivoting arm articulated at a fixed point of the body of the vehicle and articulated to said rear element and on the other hand by a groove extending inside the rear boot in which there is fitted a finger fixed to the rear part of the rear element.

The retractable roof thus embodies the sliding front part of the roof described in French patent application 010 083 and the pivoting and sliding rear part of French patent application 0 014 187.

Such a retractable roof has the advantages specific to the two roofs described previously (reduced overhang and less high rise of the roof) without having the drawbacks thereof.

Moreover, when the sliding of the front and intermediate elements towards the rear element is controlled by electric or hydraulic motors mounted on said elements, the pivoting arm articulated to the rear element can support the electric cable or the flexible pipes supplying the electric or hydraulic motors.

However, in a preferred version of the invention, said pivoting arm cooperates, during its pivoting, with a mechanism controlling the sliding of the intermediate element with respect to the rear element.

In one advantageous embodiment of the invention, said mechanism comprises a pinion whose rotation is controlled by the pivoting of the arm, this pinion being connected by other pinions to a pulley on which there is wound a cable connected to the rear of the intermediate element, so that the winding of the cable on said pulley causes the sliding of the intermediate element along the grooves extending along the rear element.

Other particular features and advantages of the invention will emerge further in the following description.

In the accompanying drawings, given by way of non-limiting examples:

Figure 1:
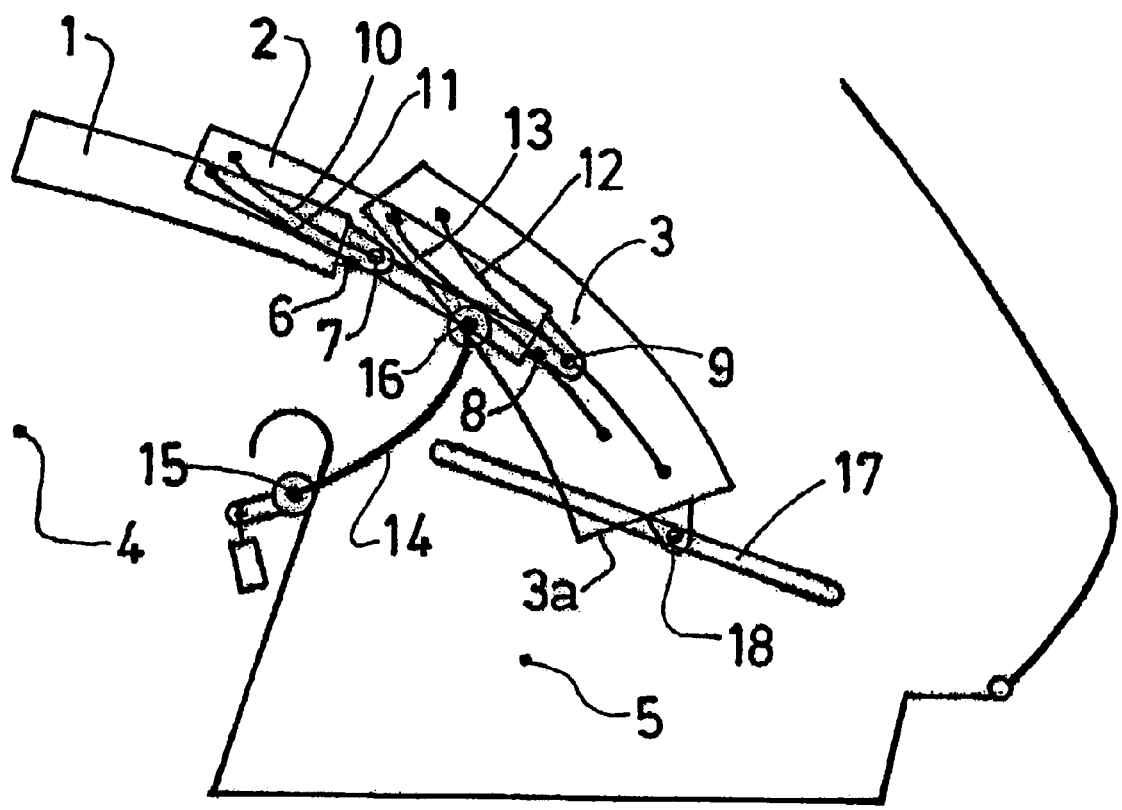
FIG. 1 is a schematic view in longitudinal section of the rear of a vehicle equipped with a retractable roof according to the invention, said roof being in the process of opening.
Figure 2:
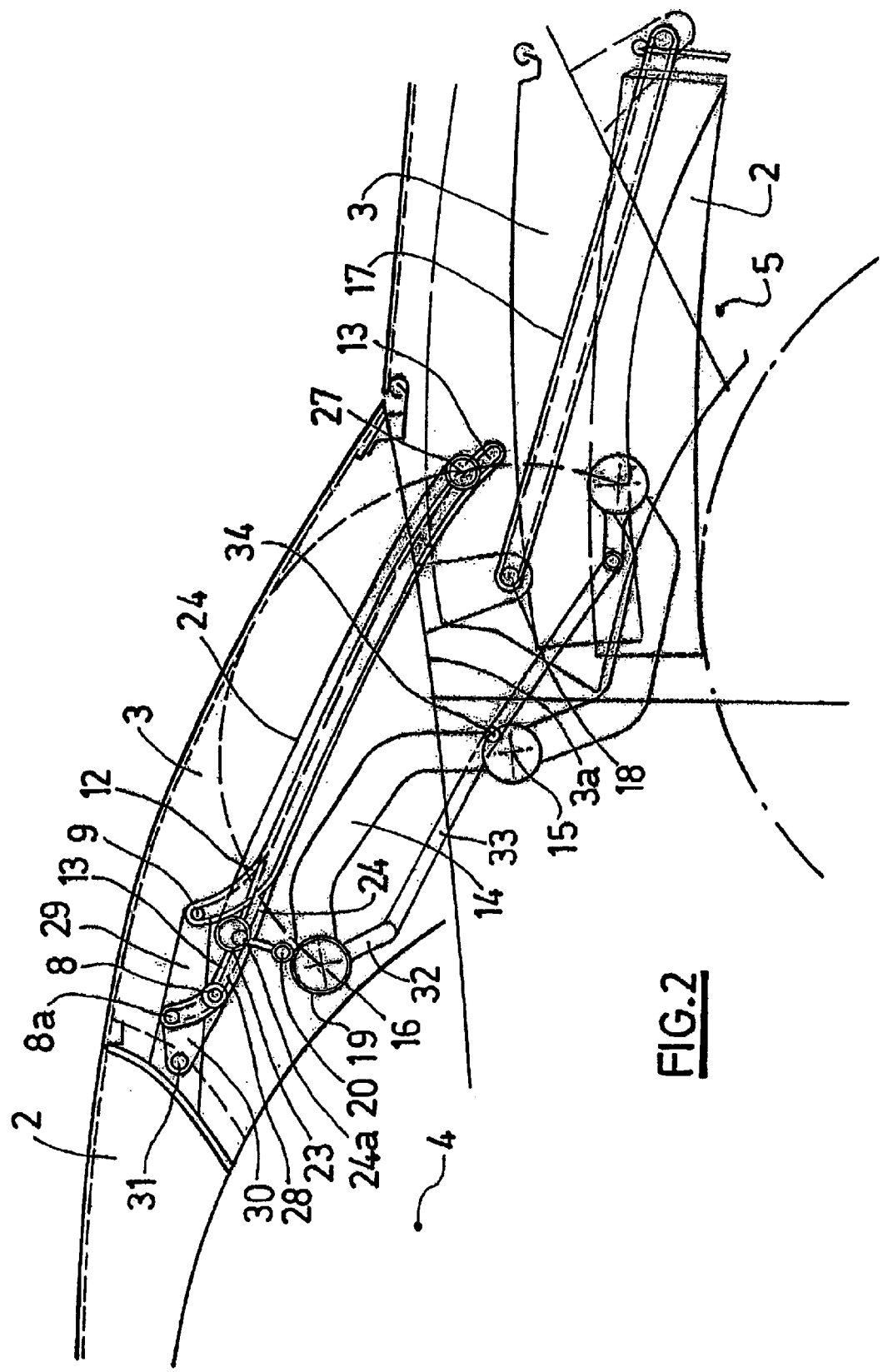
FIG. 2 is a partial schematic, in longitudinal section, showing the retractable roof in the positions of closure and of storage inside the boot of the vehicle, and the mechanism for controlling this roof.

FIGS. 1 and 2 depict a vehicle retractable roof, comprising three rigid roof elements 1, 2, 3 movable between a position in which they cover the passenger compartment 4 of the vehicle and a position in which they are stored inside the rear boot 5 of the vehicle.

The front element 1 can slide with respect to the intermediate element 2 and the latter can slide with respect to the rear element 3 by virtue of fingers 6, 7; 8, 9 carried by the front element 1 and by the intermediate element 2, fitted in grooves 10, 11; 12, 13 extending along the intermediate 2 and rear 3 elements.

The movement of the rear element 3 towards the rear boot 5 is controlled on the one hand by a pivoting arm 14 articulated at a fixed point 15 of the body of the vehicle and articulated at 16 to said rear element 3 and on the other hand by a groove 17 extending inside the rear boot 5 in which there is fitted a finger 18 fixed to the rear part 3a of the rear element 3.

In accordance with the invention, the pivoting arm 14 cooperates, during its pivoting, with a mechanism controlling the sliding of the intermediate element 2 with respect to the rear element 3.

As shown by FIG. 2, the above mechanism comprises a pinion 19 whose rotation is controlled by the pivoting of the arm 14. This pinion 19 is connected (see FIG. 3) by other pinions 20, 21, 22 to a pulley 23 on which there is wound a cable 24 connected to the rear of the intermediate element 2. Thus, the winding of the cable 24 on the pulley 23 causes, during the rotation of the latter, the sliding of the intermediate element 2 along the grooves 12, 13 extending along the rear element 3.

Figure 3:
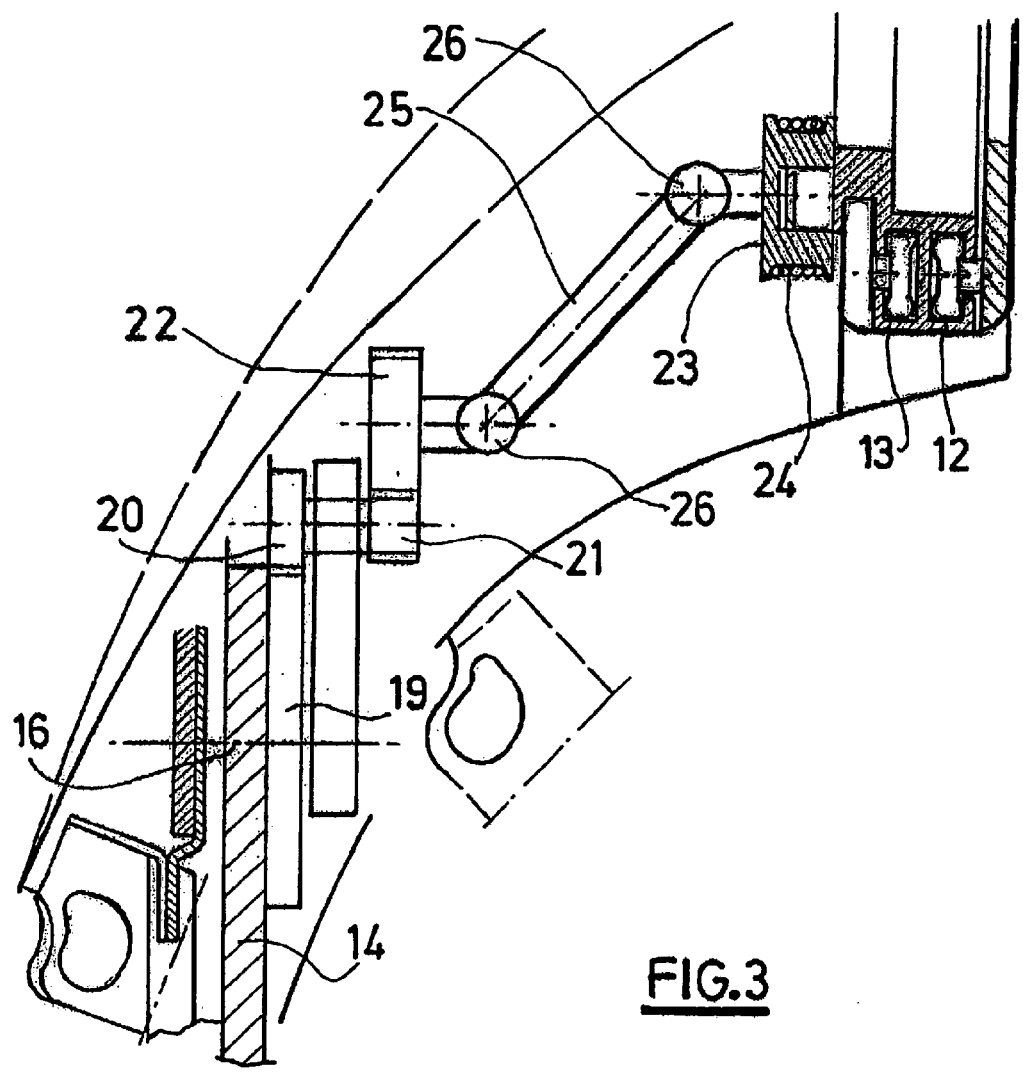
FIG. 3 is a schematic view, in partial transverse section, of the rear element of the roof, showing the mechanism for controlling this roof.

Furthermore, as shown by FIG. 3, the pulley 23 is fixed rotation-wise to one 13 of the grooves and is connected to the series of pinions 22, 21, 20 by a transmission shaft 25 which is flexible or with universal joints 26.

FIG. 2 shows moreover that the cable 24 is wound on another pulley 27 fixed close to the end of the groove 13 adjacent to the rear 3a of the rear element 3.

The end 24a of the cable 24 is connected to a connecting rod 28 extending along the groove 13 and connected to one 8 of the fingers carried by the rear of the intermediate element 2 which is fitted in the groove 13.

The mechanism for driving the front roof element 1 towards the intermediate element 2 is identical to the one described above.

In this, the pulleys and the cable are fixed, not to the rear element 3, but to the intermediate element 2.

In the example depicted in FIG. 2, the fingers 9, 31 are fixed to a protuberance 29 situated at the rear of the intermediate element 2.

Moreover, two fingers 8, 8a are fitted in the groove 13, these two fingers 8, 8a being carried by a connecting rod 30 articulated at 31 to the protuberance 29.

Furthermore, as shown by FIG. 2, the end of the grooves 12, 13 adjacent to the rear of the intermediate element 2 has a curvature directed upwards, so that the intermediate element 2 can slide under the rear element 3.

The same applies for the grooves 10, 11 of the intermediate element 2 which allow the front element 1 to slide under the intermediate element 2, as shown by FIG. 1.

In a simplified version of the invention, the pinion 19 is directly fixed rotation-wise to the end of the pivoting arm 14 which is articulated at 16 to the rear element 3.

In this case, the rotation of the arm 14 directly causes the rotation of the pulley 23 and the sliding of the element 2 under the element 3.

In a preferred version, the pinion 19 is mounted rotationally on the end of the pivoting arm 14 which is articulated to the rear element 3.

The pinion 19 has, as shown by FIG. 2, a radial extension 32 connected in an articulated manner to a connecting rod 33 itself connected in an articulated manner to a fixed point 34 of the body of the vehicle.

The above mechanism makes it possible to drive the elements of the roof 2 and 1 only when the element 3 is sufficiently clear of the rear boot 5 so that the elements 2 and 1 can move forward without being hampered by the rear of the rear seat of the passengers or their heads.

This is because, in the above mechanism, the rotation of the connecting rod 33 has little effect on the rotation of the pinion 19 at the beginning of the motion when the roof is stored in the boot 5, but starts to have an effect when the roof is sufficiently clear of the boot.

The use of the pivoting arm 14 for controlling the movement of the roof elements 1, 2, 3 towards the boot 5 also has an advantage when the sliding of the front 1 and intermediate 2 elements towards the rear element 3 is controlled by electric or hydraulic motors mounted on these elements.

This is because, in this case, the pivoting arm 14 can support the electric cable or the flexible pipes supplying these electric or hydraulic motors.

What is claimed is:

1. A vehicle retractable roof, comprising three rigid roof elements, namely a front element (1), an intermediate element (2) and a rear element (3) movable between a position in which they cover the passenger compartment (4) of the vehicle and a position in which they are stored inside the rear boot (5) of the vehicle, the front element (1) being capable of sliding with respect to the intermediate element (2) and the latter being capable of sliding with respect to the rear element (3) by virtue of fingers (6, 7; 8, 9) carried by the front element (1) and by the intermediate element (2), fitted in grooves (10, 11; 12, 13) extending along the intermediate (2) and rear (3) elements, characterised in that the movement of the rear element (3) towards the rear boot (5) is controlled on the one hand by a pivoting arm (14) articulated at a fixed point (15) of the body of the vehicle and articulated to said rear element (3) and on the other hand by a groove (17) extending inside the rear boot (5) in which there is fitted a finger (18) fixed to the rear part of the rear element (3).

2. A retractable roof according to claim 1, characterised in that said pivoting arm (14) cooperates, during its pivoting, with a mechanism controlling the sliding of the intermediate element (2) with respect to the rear element (3).

3. A retractable roof according to claim 1 characterised in that a mechanism comprising a pinion (19) whose rotation is controlled by the pivoting of the arm (14), this pinion (19) being connected by other pinions (20, 21, 22) to a pulley (23) on which there is wound a cable (24) connected to the rear of the intermediate element (2), arranged such that said cable (24) can be wound on said pulley (19) which causes the sliding of the intermediate element (2) along the grooves (12. 13) extending along the rear element (3).

4. A retractable roof according to claim 3, characterised in that said pulley (23) is fixed rotation-wise to groove (13) and is connected to said pinions (22, 21, 20) by a transmission shaft (25) which is flexible or with universal joints.

5. A retractable roof according to claim 4, characterised in that said cable (24) is wound on another pulley (27) said groove (13) having an end which is situated close to the end of said groove (13) adjacent to the rear of the rear element (3), having the end of the cable (24) connected to a connecting rod (28) extending along the groove (13) and connected to one (8) of the fingers carried by the rear of the intermediate element (2) which is fitted in the groove (13).

6. A retractable roof according to claim 1 characterised in that a mechanism comprising pinion (19) is directly fixed rotation-wise to an end of the pivoting arm (14) and articulated to the rear element (3).

7. A retractable roof according to claim 1 characterised in that a mechanism comprising pinion (19) with said pivoting arm (14) having an end upon which is mounted rotationally said pinion (19) on said end thereof which is articulated to the rear element (3), said pinion (19) having a radial extension (32) connected in an articulated manner to a connecting rod (33) itself connected in an articulated manner to the body of the vehicle.

8. A retractable roof according to claim 1, in which the front (1) and intermediate (2) elements slide towards the rear element (3) being controlled by electric or hydraulic motors mounted on said elements, characterised in that said pivoting arm (14) supports the electric cable or the flexible pipes supplying said electric or hydraulic motors.

* * * * *